(12) United States Patent
Sato et al.

(10) Patent No.: US 8,748,049 B2
(45) Date of Patent: Jun. 10, 2014

(54) FUEL CELL SYSTEM AND METHOD OF CONTROLLING FUEL CELL SYSTEM

(75) Inventors: Masashi Sato, Yokohama (JP); Susumu Maeshima, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 196 days.

(21) Appl. No.: 13/120,788

(22) PCT Filed: Aug. 7, 2009

(86) PCT No.: PCT/JP2009/064033
§ 371 (c)(1),
(2), (4) Date: Mar. 24, 2011

(87) PCT Pub. No.: WO2010/035580
PCT Pub. Date: Apr. 1, 2010

(65) Prior Publication Data
US 2011/0183223 A1    Jul. 28, 2011

(30) Foreign Application Priority Data
Sep. 26, 2008    (JP) ................................ 2008-247885

(51) Int. Cl.
*H01M 8/04*    (2006.01)

(52) U.S. Cl.
CPC ...... *H01M 8/04089* (2013.01); *H01M 8/04156* (2013.01); *H01M 8/04179* (2013.01)
USPC ......................................... 429/414; 429/535

(58) Field of Classification Search
CPC .......... H01M 8/04089; H01M 8/0456; H01M 8/04179
See application file for complete search history.

(56) References Cited

U.S. PATENT DOCUMENTS

| | | | |
|---|---|---|---|
| 2004/0166387 A1 | 8/2004 | Imamura et al. | |
| 2005/0260463 A1* | 11/2005 | Chapman et al. | ............... 429/13 |
| 2009/0110970 A1 | 4/2009 | Tejima | |

FOREIGN PATENT DOCUMENTS

| | | | |
|---|---|---|---|
| JP | 2001-118587 A | | 4/2001 |
| JP | 2003-331892 A | | 11/2003 |
| JP | 2004-265862 A | | 9/2004 |
| JP | 2004265862 A | * | 9/2004 |
| JP | 2005-32587 A | | 2/2005 |
| JP | 2005032587 A | * | 2/2005 |
| JP | 2006-111266 A | | 4/2006 |
| JP | 2007-157621 A | | 6/2007 |
| JP | 2007-242449 A | | 9/2007 |
| JP | 2008-147093 A | | 6/2008 |

* cited by examiner

*Primary Examiner* — Ula C Ruddock
*Assistant Examiner* — Scott J Chmielecki
(74) *Attorney, Agent, or Firm* — Foley & Lardner LLP

(57) ABSTRACT

At a start of a fuel cell, discharge of a generated water is ended at a proper timing. Supply of the reactive gas is started at a first flowrate. Then, in a case that the generated water retained by a reactive electrode is determined to outflow to an internal gas flow channel side among unit cells more than or equal to a preset determination cell number, the flowrate of the reactive gas is changed to a second flowrate that is smaller than the first flowrate.

3 Claims, 5 Drawing Sheets

FUEL CELL SYSTEM AND METHOD OF CONTROLLING FUEL CELL SYSTEM

TECHNICAL FIELD

The present invention relates to a fuel cell system and a method of controlling the fuel cell system.

BACKGROUND ART

Conventionally, a fuel cell system is known which has a fuel cell which allows an oxidant gas supplied to an oxidant electrode to be electrochemically reacted with a fuel gas supplied to a fuel electrode to thereby implement an electric generation. Ordinarily, the fuel cell has such a structure that a plurality of unit cells are stacked, where each of the unit cells has a reactive electrode (oxidant electrode or fuel electrode) and an internal gas flow channel for supplying a reactive gas (oxidant gas or fuel gas) to the reactive electrode.

With respect to the above type of fuel cell system, in each of the individual unit cells, a water is generated in the reactive electrode. The unit cell where the internal gas flow channel is blocked with the thus generated water has a difficulty in supplying the reactive gas to the reactive electrode. Therefore, a voltage shows an unstable transition, thereby, as the case may be, the electric generation of the fuel cell cannot be implemented stably.

For example, Patent Literature 1 discloses a method of increasing flowrate of a reactive gas supplied to the fuel cell, to thereby discharge a generated water staying in an internal gas flow channel, thus accomplishing stability of generation of the fuel cell.

PRIOR ART LITERATURE

Patent Literature

Patent Literature 1: Japanese Patent Application Laid-Open No. 2006-111266

SUMMARY OF INVENTION

Problems to be Solved by the Invention

With the method disclosed in the Patent Literature 1, increasing the flowrate of the reactive gas makes it possible to discharge the generated water staying in the internal gas flow channel. However, this discharge processing of the generated water, as the case may be, excessively supplies the reactive gas, depending on a timing of ending the discharge processing.

Means for Solving the Problem

For solving the above problem, under the present invention, the reactive gas supply to the fuel cell is started at a first flowrate. When it is determined that a generated water retained by the reactive electrode has outflowed to the internal gas flow channel side among the unit cells more than or equal to a preset determination cell number (the number of cells for determination), the flowrate of the reactive gas is changed from the first flowrate to the second flowrate that is smaller than the first flowrate.

Effect of the Invention

Under the present invention, after the reactive gas supply to the fuel cell is started, the generated water outflow to the internal gas flow channel side among the unit cells more than or equal to the determination cell number is sensed, to thereby making it possible to determine that variation of the reactive gas distribution quantity to the individual unit cells is improved. This improvement of the variation eliminates the need of increasing the flowrate of the reactive gas, thus making it possible to decrease the flowrate. With this, in the discharge processing of the generated water, the possibility of excessively supplying the reactive gas can be decreased.

MODE FOR CARRYING OUT THE INVENTION (First Embodiment)

Figure 1:
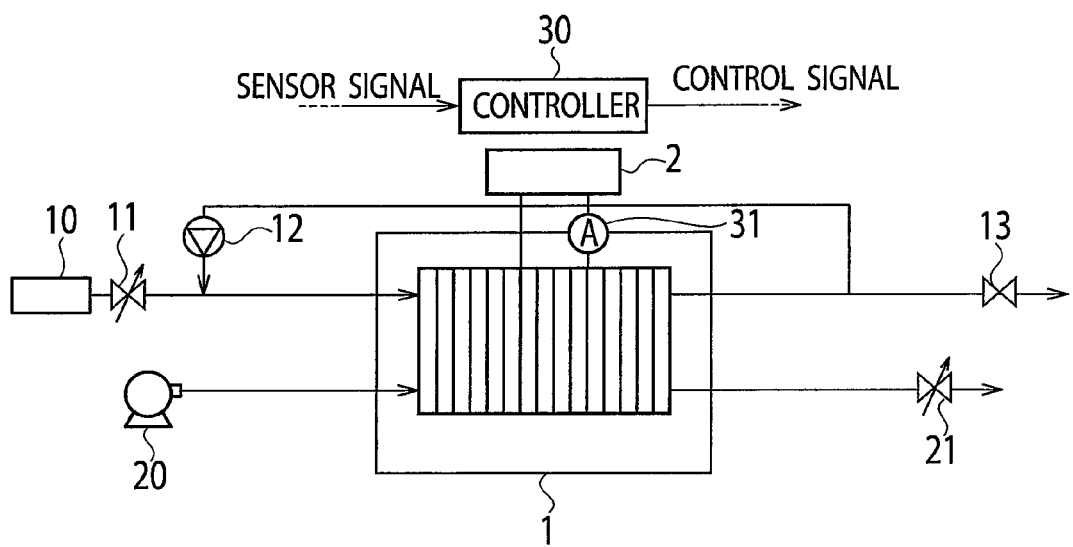
FIG. 1 is a structural view schematically showing a fuel cell system according to the first embodiment.

FIG. 1 is a structural view schematically showing a fuel cell system according to the first embodiment of the present invention. The fuel cell system is installed on, for example, a vehicle as a mobile unit, where the vehicle is driven by means of an electric power supplied from the fuel cell system.

The fuel cell system is provided with a fuel cell stack (fuel cell) 1 which is formed by stacking a plurality of unit cells where a fuel cell structure is sandwiched by a pair of separators. Herein, the fuel cell structure is formed by sandwiching a solid macromolecular electrolytic membrane between a pair of electrodes (reactive electrodes), that is, a fuel electrode and an oxidant electrode. The solid macromolecular electrolyte includes an ion-conductive macromolecular membrane such as, for example, a fluorine contained resin ion exchange membrane. Containing the water after being saturated with water, the solid macromolecular electrolyte serves as an ion-conductive electrolyte. The fuel electrode includes a platinum catalytic layer carrying thereon a catalyst such as platinum and the like and a gas diffusion layer including a porous body such as carbon fiber and the like. The oxidant electrode includes a platinum catalytic layer carrying thereon a catalyst such as platinum and the like and a gas diffusion layer including a porous body such as carbon fiber and the like. Moreover, the separators sandwiching the fuel cell structure from both sides are each formed with an internal gas flow channel for supplying a reactive gas (fuel gas or oxidant gas) to the individual reactive electrodes.

With respect to the fuel cell stack 1, in the individual unit cells, the fuel gas is supplied to the fuel electrode and the oxidant gas is supplied to the oxidant electrode, to thereby implement an electric generation by electrochemically reacting the fuel gas with the oxidant gas. According to the first embodiment, an explanation is made about a case where a hydrogen is used as the fuel gas while an air is used as the oxidant gas.

The fuel cell system is provided with a hydrogen system for supplying the hydrogen to the fuel cell stack 1 and an air system for supplying the air to the fuel cell stack 1.

The hydrogen system is provided with a fuel gas supplying section for supplying the hydrogen (as the fuel gas) to the fuel cell stack 1. Specifically, for example, the hydrogen is stored in a fuel tank 19 such as a high pressure hydrogen bomb, and the hydrogen is supplied from the fuel tank 10 to the fuel cell stack 1 via a hydrogen supplying channel. In the hydrogen supplying channel, a tank source valve (not shown) is disposed on a downstream side of the fuel tank 10 and a depressurizing valve (not shown) is disposed on a downstream side of the tank source valve. With the tank source valve in an open state, the high pressure hydrogen gas from the fuel tank 10 is mechanically depressurized to a certain pressure by means of the depressurizing valve. Moreover, in the hydrogen supplying channel, a hydrogen pressure adjusting valve 11 is disposed on a downstream side of the depressurizing valve. The hydrogen pressure adjusting valve 11 adjusts the pressure of the hydrogen depressurized by means of the depressurizing valve, so that the hydrogen pressure at the fuel electrode of the fuel cell stack 1 becomes a desired pressure.

The discharge gas (a gas including an unused hydrogen) from the individual fuel electrodes of the fuel cell stack 1 is discharged to a hydrogen circulation flow channel. Another end of the hydrogen circulation flow channel is connected to a downstream side relative to the hydrogen pressure adjusting valve 11 of the hydrogen supplying channel. The hydrogen circulation flow channel is provided with a hydrogen circulating section such as, for example, a hydrogen circulating pump 12. The gas discharged from the fuel electrode of the fuel cell stack 1 is circulated to the fuel electrode of the fuel cell stack 1 by means of the hydrogen circulating section.

By the way, in the case of using the air as the oxidant gas, an impurity (for example, nitrogen) included in the oxidant gas supplied to the oxidant gas electrode, as the case may be, transmits to the fuel electrode side. Therefore, the impurity concentration in the circulating system including the fuel electrode and hydrogen circulation flow channel is increased, thereby hydrogen partial pressure is likely to be decreased. In the case of a high impurity concentration, an inconvenience such as decrease in output of the fuel cell stack 1 is caused, thus it is necessary to control the impurity concentration in the circulating system.

Then, the hydrogen circulation flow channel is provided with a purge flow channel for purging the impurity from inside of the circulation system. The purge flow channel is provided with a purge valve 13. Switching the purge valve 13 from a closed state to an open state according to necessity can outwardly discharge the circulating gas flowing in the hydrogen circulation flow channel. With this, the purge of the impurity can be implemented, thus making it possible to adjust the impurity concentration in the circulating system.

The air system has an oxidant gas supplying section for supplying the air (as the oxidant gas) to the fuel cell stack 1. Specifically, the air is supplied to the fuel cell stack 1 via an air supply flow channel. The air supply flow channel is provided with a compressor 20. Taking in an atmosphere (air), the compressor 20 pressurizes the air and then discharges the air. The thus pressurized air is supplied to the fuel cell stack 1.

The gas discharged from the individual oxidant electrodes of the fuel cell stack 1 (air with consumed oxygen) is outwardly discharged (to the atmosphere) via an air discharge flow channel. In the air discharge flow channel, an air pressure adjusting valve 21 is provided. The air pressure adjusting valve 21 adjusts the pressure of the air, so that the pressure in the oxidant electrode of the fuel cell stack 1 becomes a desired pressure.

An output takeout device 2 for controlling an output (for example, current) taken out from the fuel cell stack 1 is connected to the fuel cell stack 1. Via the output takeout device 2, the power generated at the fuel cell stack 1 is supplied to an electric motor or a battery for driving a vehicle, or to various accessories for implementing the generation by the fuel cell stack 1 (for example, the compressor 20, the hydrogen circulating pump 12 and the like) and various accessories for the vehicle (air conditioner and the like).

A controller (controlling section) 30 has a function of entirely controlling the fuel cell system. Being operated according to a control program, the controller 30 controls operating conditions of the fuel cell system. As the controller 30, a microcomputer having main components such as CPU, ROM, RAM, I/O interface can be used. Based on the condition of the fuel cell system, the controller 30 implements various calculations and then outputs the thus obtained calculation results (as control signals) to various actuators (not shown). With this, opening of the hydrogen pressure adjusting valve 11, rotational speed of the hydrogen circulating pump 12, rotational speed of the compressor 20, opening of the air pressure adjusting valve 21 and current taken out by the output takeout device 2 can be controlled.

Sensor signals from various sensors and the like are inputted to the controller 30, so as to sense (detect) conditions of the fuel cell system. A current sensor 31 senses the current taken out from the fuel cells tack 1 (hereinafter referred to as "stack current").

With respect to the relation with the first embodiment, the controller (controlling section and determining section) 30 determines that the generated water retained by the fuel electrode has outflowed to the internal gas flow channel side among the unit cells more than or equal to a preset determination cell number (determination of generated water outflow). Moreover, in the starting process implemented at the start of the fuel cell system, the controller 30 starts the hydrogen supply at an after-described start flowrate (first flowrate). In the case that the determination of the generated water outflow is implemented, the controller 30 changes the hydrogen flowrate from the start flowrate to an after-described ordinary operation flowrate that is smaller than the start flowrate.

Not limited to processing the fuel electrode side as a control target, the controller 30 is capable of processing the oxidant side as the control target. Specifically, in the starting process implemented at the start of the fuel cell system, the controller 30 supplies the air at the start flowrate (first flowrate). Moreover, the controller 30 implements the determination of the generated water outflow in the case of determining that the generated water retained by the oxidant electrode has outflowed to the internal gas flow channel side among the unit cells more than or equal to the preset determination cell number. Then, in the case that the determination of the generated water outflow is implemented, the controller 30 changes the air flow rate from the start flowrate to an after-described ordinary operation flowrate.

In the above control, according to the generated water conditions with respect to the fuel cell stack 1, the process may be implemented by using only one of the fuel electrode and the oxidant electrode as the control target, otherwise the process may be implemented in parallel by using both of the fuel electrode and the oxidant electrode as the control targets. Moreover, the process may be comprehensively implemented by using both of the fuel electrode and the oxidant electrode as the control targets. In this case, when the determination of the generated water outflow is implemented in both of the fuel electrode and the oxidant electrode, the flowrate of each of the hydrogen and the air is decreased from the start flowrate to the ordinary operation flowrate.

In addition, according to the first embodiment, in view of variation of the control forms stated above, for convenience sake, the fuel electrode or oxidant electrode is to be collectively referred to as a reactive electrode and the hydrogen or air is to be collectively referred to as a reactive gas.

Figure 2:
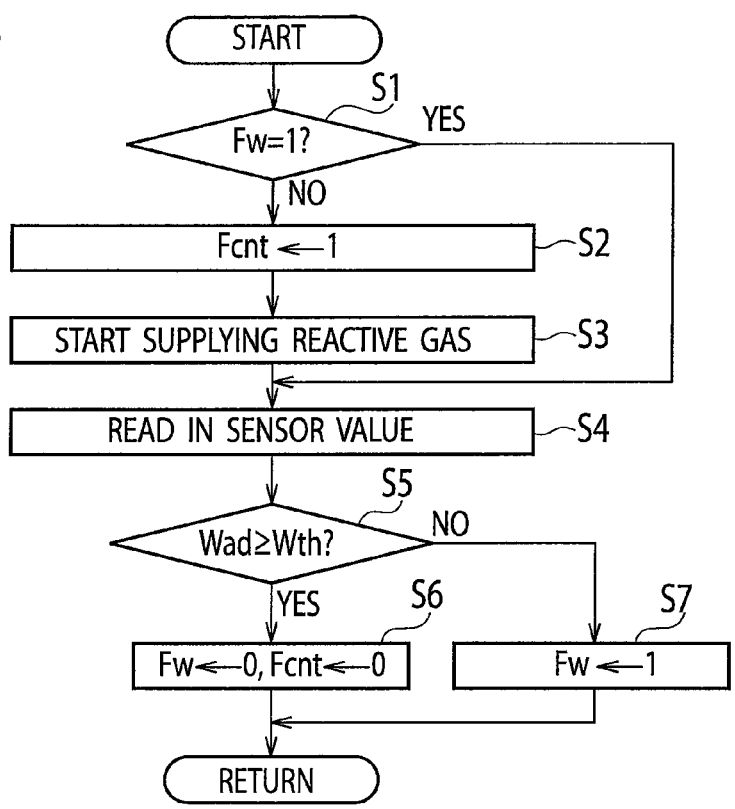
FIG. 2 is a flowchart showing procedures of a method of controlling the fuel cell system.

FIG. 2 is a flowchart showing procedures of a method of controlling the fuel cell system, according to the first embodiment of the present invention. A series of the procedures shown in this flowchart show flows of starting processes implemented at the start of the fuel cell system and are implemented by the controller 30 with an on signal, for example, of an ignition switch as a trigger.

At first, at step 1 (S1), whether a generated water discharge flag Fw is "1" or not is determined. The generated water discharge flag Fw is a flag for determining whether an after-described discharge processing is implemented or not and is initially set to "0." Therefore, until the generated water discharge flag Fw is set to "1," the determination at the step 1 is negative. Therefore, the routine proceeds to step 2 (S2). On the other hand, when the generated water discharge flag Fw is set to "1," the determination at step 1 is positive. Therefore, skipping the processes at step 2 and step 3 (S3), the routine proceeds to step 4 (S4).

At step 2, a count flag Fcnt is set to "1." The count flag Fcnt is a flag for determining whether a timer is being operated or not, where the timer counts an elapse of time from the start of the reactive gas supply, that is, an elapse of time from when the generation by the fuel cell stack 1 is started. The count flag Fcnt is initially set to "0." In a condition that the count flag Fcnt is set from "0" to "1" at step 2, the controller 30 starts counting the elapse of time by means of the timer.

At step 3, the reactive gas supply is started. Specifically, the controller 30 controls the hydrogen pressure adjusting valve 11 and the compressor 20, to thereby start the reactive gas supply. In this case, the controller 30 implements the reactive gas supply at the start flowrate that is set larger than the ordinary operation flowrate (that is, a design flowrate for operating the fuel cell stack 1) set in the ordinary operation (start of discharge processing).

At step 4, a sensor value is read in. Specifically, according to the first embodiment, a stack current sensed by the current sensor 31 is read in.

At step 5 (S5), whether or not a generated water added quantity Wad is more than or equal to a determination value Wth is determined. The generated water added quantity Wad is an addition of the generated water quantity generated at the fuel cell stack 1, with a timing for starting the generation by the fuel cell stack 1 as a start point. A per-unit-time water quantity generated by the fuel cell stack 1 is proportional to the takeout current from the fuel cell stack 1. Therefore, periodically reading in the stack current and monitoring a longitudinal (time course) transition of the stack current can calculate the generated water added quantity Wad.

On the other hand, the determination value Wth is calculated by multiplying a liquid retainable quantity of the unit cell by the preset determination cell number (for example, the number equivalent to all cells included in the fuel cell stack 1). Herein, the liquid retainable quantity of the unit cell is a generated water quantity which can be retained by the unit cell, specifically, by the gas diffusion layer. The liquid retainable quantity of the unit cell can be obtained during a development of the unit cell, or through experiments and simulations. In other words, the determination value Wth shows the generated water's total quantity that is retainable by the unit cells equivalent to the determination cell number.

By the determination at step 5, in the fuel cell stack 1, among the unit cells more than or equal to the determination cell number (for example, all cells), whether or not the generated water retained by the reactive electrode (gas diffusion layer) has outflowed to the internal gas flow channel side can be determined. When the determination is positive at step 5, that is, in the case of the generated water quantity Wad more than or equal to the determination value Wth, the determination of the generated water outflow is implemented, and then the routine proceeds to step 6 (S6). When the determination is negative at step 5, that is, in the case of the generated water quantity Wad less than the determination value Wth, the routine proceeds to step 7 (S7).

At step 6, the count flag Fcnt is set to "0" and the generated water discharge flag Fw is set to "0." In a condition that the count flag Fcnt is set from "1" to "0," the controller 30 stops the timer count and resets the elapsed time to zero. Moreover, in a condition that the generated water discharge flag Fw set from "1" to "0," the controller 30 changes the flowrate from the start flowrate to the ordinary operation flowrate, to thereby implement the reactive gas supply.

At step 7, the generated water discharge flag Fw is set to "0," then the present routine is ended.

Figure 3:
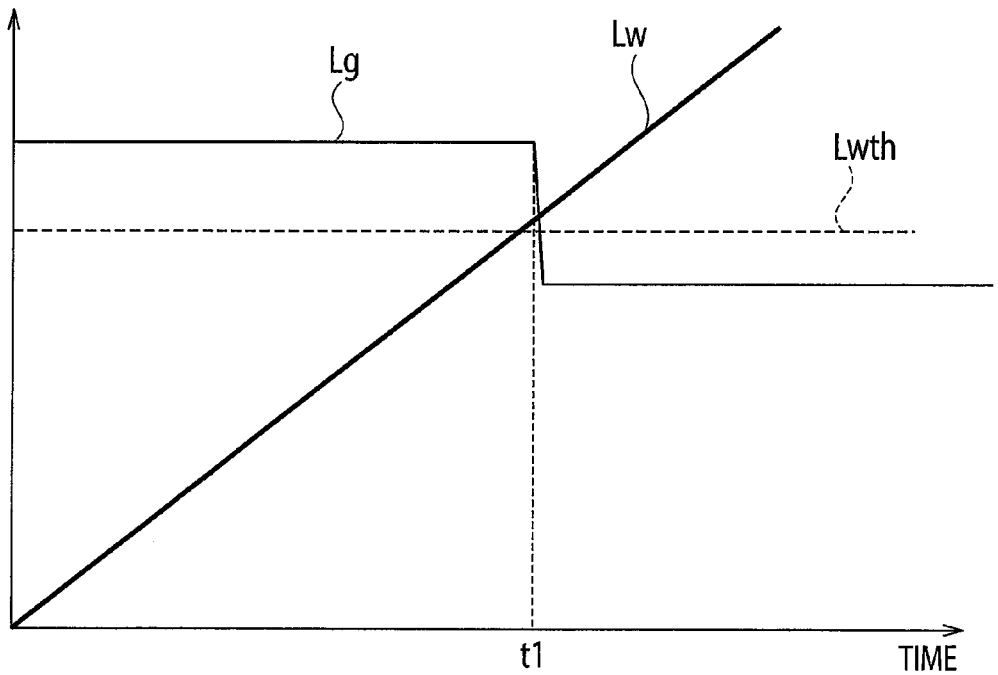
FIG. 3 is a timing chart in the starting process.

FIG. 3 shows a timing chart of the starting process according to the first embodiment of the present invention. In FIG. 3, Lg denotes a transition of the flowrate of the reactive gas supplied to the fuel cell stack 1, Lw denotes a transition of the generated water added quantity Wad and Lwth denotes the determination value Wth.

As stated above, according to the first embodiment, the controller 30 supplies the reactive gas at the start flowrate in the starting process implemented at the start of the fuel cell system. Moreover, determining that the generated water retained by the reactive electrode has outflowed to the internal gas flow channel side among the unit cells more than or equal to the preset determination cell number, the controller 30 implements the determination of the generated water outflow (timing t1). Then, in the case of implementing the determination of the generated water outflow, the controller 30 changes the reactive gas flowrate from the start flowrate to the ordinary operation flowrate.

Figure 4:
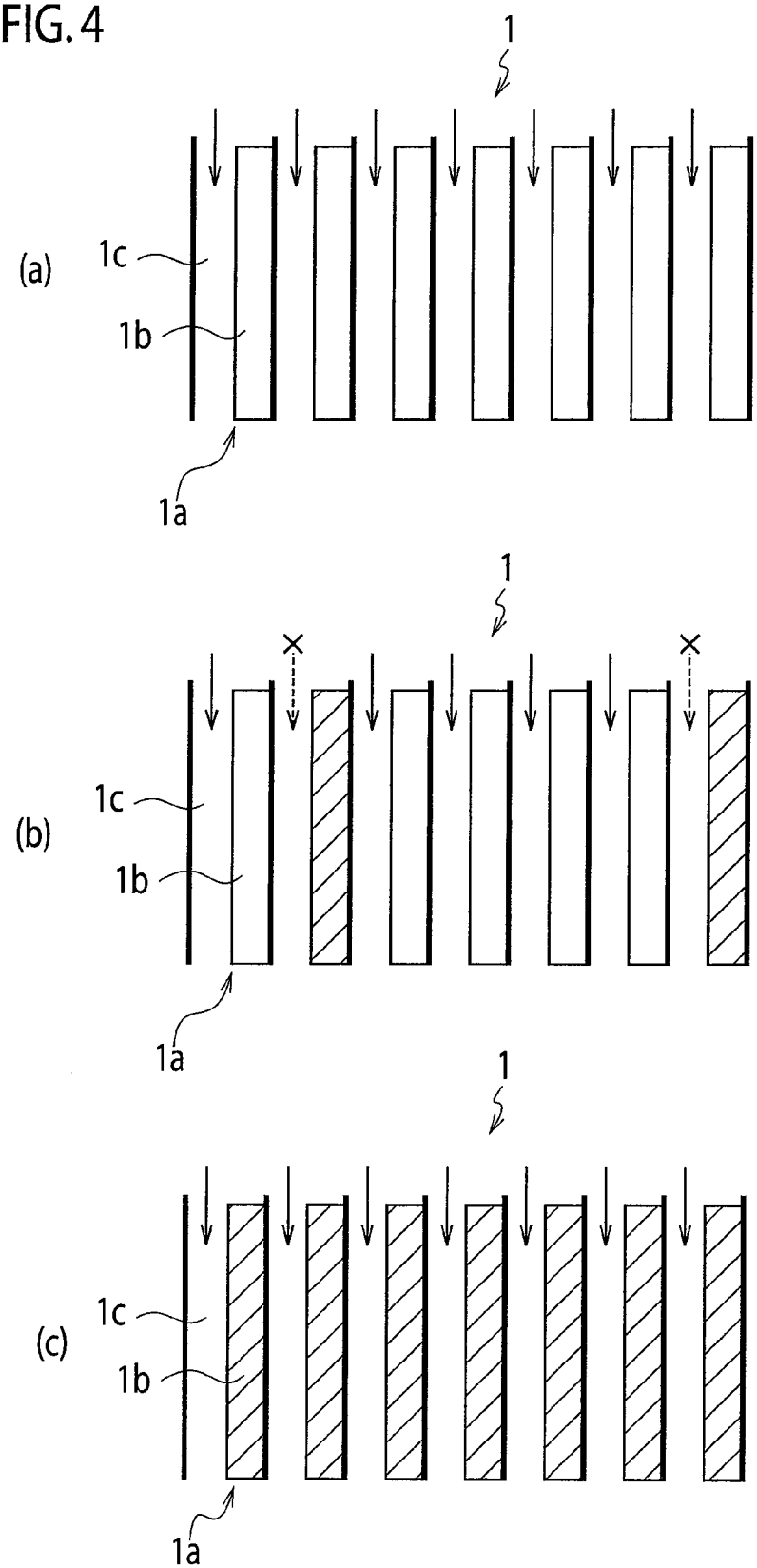
FIG. 4 is a cross sectional view schematically showing an internal structure of a fuel cell stack 1.

FIG. 4 is a cross sectional view schematically showing an internal structure of the fuel cell stack 1. When the generation is started at the fuel cell stack 1, the water is generated in each of the unit cells 1a according to a generation reaction. In a scene where the operating temperature of the fuel cell stack 1 is low, i.e., at the start of the fuel cell system and the like, a water content introduced by the generated water or by the supplied gas is more likely to be condensed in a gas diffusion layer 1b or an internal gas flow channel 1c, compared with a scene where the operating temperature of the fuel cell stack is high. Therefore, the thus condensed water content prevents the reactive gas supply, as the case may be, causing a generation disability (what is called a flooding).

Moreover, in the following cases, even when the temperature of the fuel cell stack 1 is high, the generated water wets the gas diffusion layer 1b, that is, the generated water is retained by the gas diffusion layer 1b:
  the generation is started from a condition that the gas diffusion layer is dried, and
  at a restart after the temperature is increased through a sufficient operation.

The generated water is retained by the gas diffusion layer 1b until a liquid retainable quantity of the gas diffusion layer 1b is reached, failing to outflow to the internal gas flow channel 1c side {refer to FIG. 4(a)}. In FIG. 4(a), an arrow denoted by an actual line shows a flow of the reactive gas. When the generated water quantity retained by the gas diffusion layer 1b reaches the liquid retainable quantity, the generated water flooding from the gas diffusion layer 1b outflows to the internal gas flow channel 1c side. The liquid retainable quantity of the gas diffusion layer 1b is likely to depend on the temperature of the unit cell. Specifically, the liquid retainable quantity of the gas diffusion layer 1b is likely to be greater as the temperature is higher. According to the difference between the individual unit cells or the temperature difference, the liquid retainable quantities in the individual unit cells 1a, as the case may be, vary. With this, the timing at which the generated water outflows to the internal gas flow channel 1c, as the case may be, differs among the individual unit cells 1a.

In the unit cell 1a where the generated water outflowed to the internal gas flow channel 1c, the generated water floods to the internal gas flow channel 1c, causing what is called a flooding. A pressure loss of the internal gas flow channel 1c in the unit cell 1a where the flooding causes the generated water to stay in an internal gas flow channel is higher compared with that of the unit cell 1a free of the generated water outflow. Therefore, the pressure loss of the internal gas flow channel 1c varies among the unit cells 1a, thus causing a unit cell 1a that is deteriorated in the reactive gas distribution to the unit cell 1a {refer to FIG. 4(b)}. In FIG. 4(b), the hatched gas diffusion layer 1b shows a state that the generated water has outflowed to the internal gas flow channel 1c side. With this, in the unit cell 1a where the reactive gas is unlikely to be distributed, the reactive gas may be short.

Therefore, according to the first embodiment, when the generation is started, the reactive gas supply is implemented at the start flowrate that is larger than the ordinary operation flowrate. With this, the flowrate of the reactive gas is increased, making it possible to supply the reactive gas even for the unit cell 1a that causes a large pressure loss and thereby causes the reactive gas shortage at the ordinary operation flowrate.

Moreover, when the generated water outflows to the internal gas flow channel 1c side among the unit cells 1a more than or equal to the determination cell number, the variation of the pressure loss of the individual unit cells 1a is resolved {refer to FIG. 4(c)}. With this, the reactive gas distribution to the unit cell 1a can be recovered. Thereby, the reactive gas flowrate can be returned to the ordinary operation flowrate.

As set forth above, according the first embodiment, the timing at which the generated water outflowed to the internal gas flow channel side among the unit cells more than equal to the determination cell number can be sensed. With this, the timing for ending the period in which the reactive gas has deteriorated distribution property and the voltage is unstable can be accurately determined. With this, the period which is increasing the reactive gas flowrate, that is, the discharge processing of the generated water staying in the internal gas flow channel can be ended at a proper timing.

Moreover, according to the first embodiment, based on the number of unit cells where the generated water outflowed to the internal gas flow channel side and based on a degree of a variation of the reactive gas distribution to the individual unit cells, the determination cell number is set in such a manner that the number of all of the unit cells included in the fuel cell stack 1 is defined as an upper limit.

Herein, the standard for setting the determination value Wth is to be set forth. The determination cell number is defined, for example, as the number of all unit cells 1a included in the fuel cell stack 1. In this case, the determination value Wth is a total of liquid retainable quantities of the gas diffusion layers 1b corresponding to the all unit cells 1a. Then, when the generated water outflows to the internal gas flow channel 1c side in each of the all unit cells 1a, the variation of the pressure loss among the unit cells 1a can be suppressed. Thereby, the reactive gas flowrate can be returned to the ordinary operation flowrate.

In addition, the determination cell number is not limited to the total unit cell number included in the fuel cell stack 1. For example, a lower limit of the determination cell number can be set in the following manner: counting the number of unit cells where the generated water outflowed from the gas diffusion layer to the internal gas flow channel side and then counting the number of unit cells where it can be determined that the reactive gas distribution property has been improved.

Figure 5:
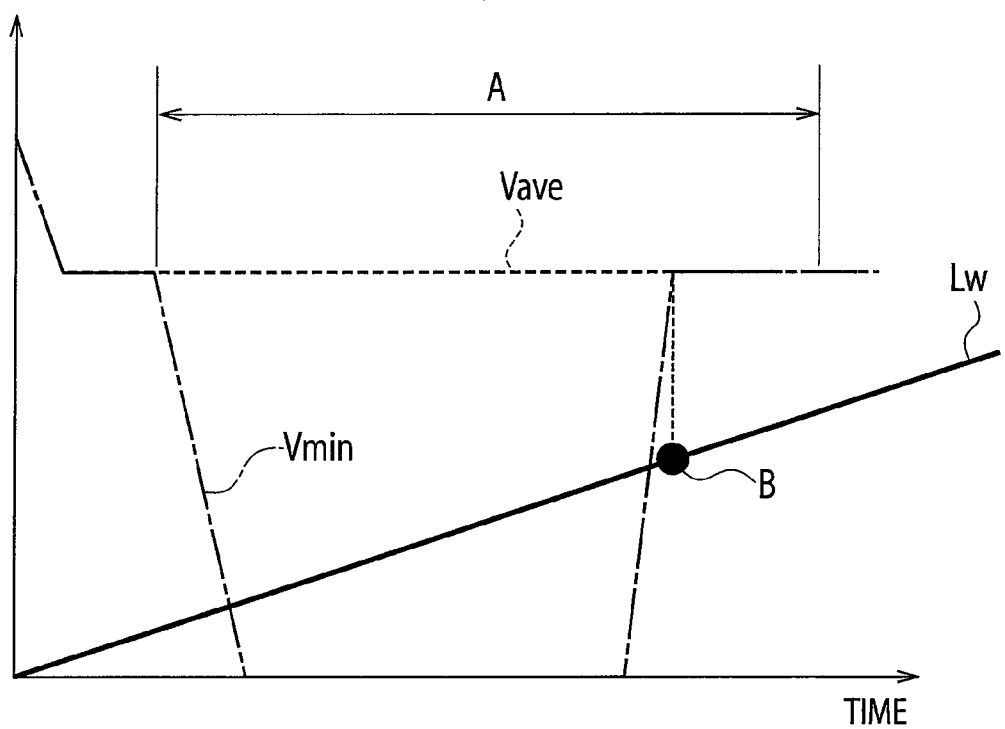
FIG. 5 is an explanatory view showing a design standard of a determination value Wth.

FIG. 5 is an explanatory view showing a design standard of the determination value Wth. Specifically, at first, a constant generation state with the takeout current kept constant is set for the fuel cell stack 1. In this case, at a timing at which the generated water outflow to the internal gas flow channel starts varying among the unit cells, the unit cell having the worst reactive gas distribution continues the generation at such a reactive gas flowrate as may cause the flooding. Then, the generated water outflows to the internal gas flow channel side among a preset number of unit cells, to thereby improve the distribution property of the reactive gas and resolve the flooding. The generated water added quantity which is obtained until the distribution property of the reactive gas is improved and the flooding is resolved is calculated as the determination value Wth.

Herein, in FIG. 5, A denotes a capacity equivalent to the gas diffusion layers of the all unit cells included in the fuel cell stack 1 and Lw denotes the generated water added quantity Wad. Moreover, Vave denotes an average voltage with respect to the individual unit cells and Vmin denotes a minimum voltage among the individual unit cells. The unit cell causing the flooding has a decreased generation efficiency, thus showing a tendency of decreased voltage. Moreover, at the timing at which the flooding is resolved, the decrease of the voltage is resolved. Therefore, the determination value Wth can be set from the generated water added value at a point B which corresponds to the timing at which the flooding is resolved.

Moreover, according to the first embodiment, based on the stack current's time-series transition with the generation start timing as the start point, the controller 30 calculates the generated water added quantity Wad of the fuel cell stack 1. Then, the controller 30 implements the determination of the generated water outflow in a condition that the generated water added quantity Wad reaches the determination value Wth, that is, when the generated water added quantity Wad reaches the total quantity of the generated water which total quantity is obtained when the generated water outflows to the internal gas flow channel side among the unit cells more than or equal to the determination cell number.

After the generation start, when the generated water over the liquid retainable quantity of the gas diffusion layer outflows to the internal gas flow channel side among the unit cells more than or equal to the determination cell number, it is determined that the voltage has escaped from an unstable region (a region having variation in pressure loss). Calculating the generated water added quantity (Wad) from the stack current can accurately sense the value.

(Second Embodiment)

Figure 6:
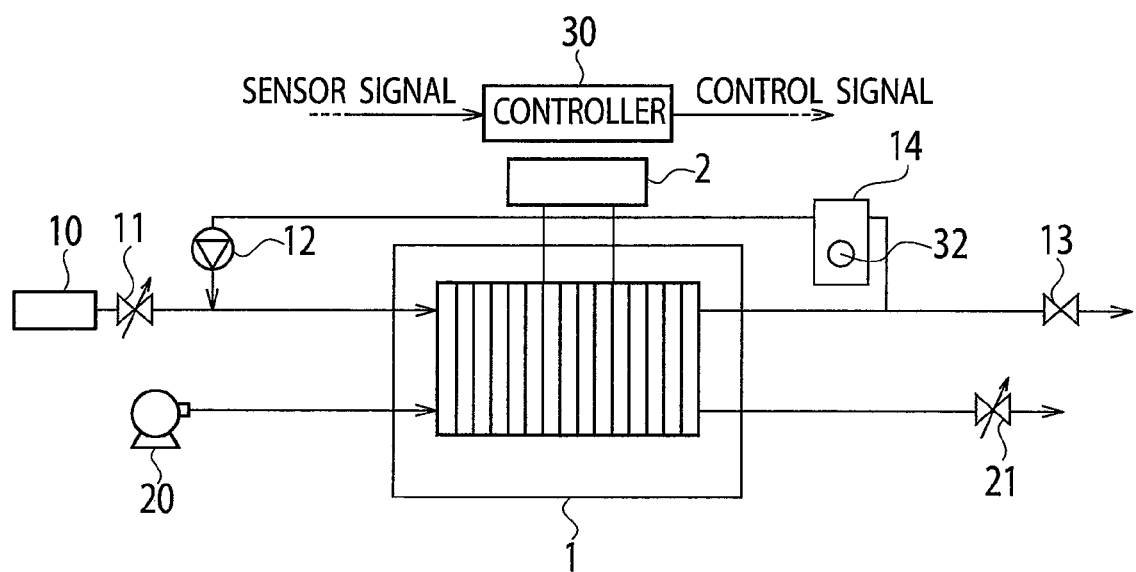
FIG. 6 is a structural view schematically showing the fuel cell system according to the second embodiment.

FIG. 6 is a structural view schematically showing the fuel cell system according to the second embodiment of the present invention. The fuel cell system according to the second embodiment is different from that according to the first embodiment, in that the generated water added quantity Wad is directly measured according to the second embodiment. Hereinafter, explanation of structures same as those according to the first embodiment is to be omitted and differences are to be mainly set forth.

Specifically, the hydrogen circulation flow channel is provided with an air-liquid separator 14. Into an air component and a liquid component, the air-liquid separator 14 separates the gas flowing in the hydrogen circulation flow channel, namely, the gas which includes the generated water. The thus separated generated water is stored in the air-liquid separator 14 and then outwardly discharged via a flow channel (not shown) when necessary. The air-liquid separator 14 is provided with a level sensor 32 for sensing a water level of the thus stored generated water. In other words, the level sensor 32 is disposed on an outlet side of the reactive gas relative to the fuel cell stack 1 and senses the generated water quantity discharged from the fuel cell stack 1. A sensor signal from the level sensor 32 is inputted to the controller 30.

Based on the sensor signal from the level sensor 32, that is, the water level of the generated water, the controller 30 calculates the generated water added quantity Wad. Then, comparing the generated water added quantity Wad with the determination value Wth, the controller 30 determines, like the first embodiment, whether or not the generated water has outflowed to the internal gas flow channel side among the unit cells more than or equal to the determination cell number.

After the generation start, when the generated water over the liquid retainable quantity of the gas diffusion layer outflows to the internal gas flow channel side among the unit cells more than or equal to the determination cell number, it is determined that the voltage has escaped from the unstable region (a region having variation in pressure loss). Directly sensing the quantity of the generated water discharged from the fuel cell stack 1 can accurately sense the generated water added quantity (Wad).

In addition, according to the second embodiment, a sensor for sensing the generated water quantity discharged from the fuel cell stack 1 is disposed only on the hydrogen system side on the premise that the generated water is retained mainly on the fuel electrode side. The present invention is, however, not limited to this. In the case that the generated water is retained on the oxidant electrode side, the sensor may be disposed only on the oxygen system side. Moreover, the sensors may be disposed both on the hydrogen system and the air system.

Moreover, a sensor may be disposed on the outlet side of the reactive gas relative to the fuel cell stack 1 so as to sense a discharge speed of the generated water discharged from the fuel cell stack 1. In this case, the controller 30 implements the determination of the generated water outflow in a condition that the thus sensed discharge speed reaches the generated water discharge speed that is obtained when the generated water outflows to the internal gas flow channel side among the unit cells more than or equal to the determination cell number.

(Third Embodiment)

Figure 7:
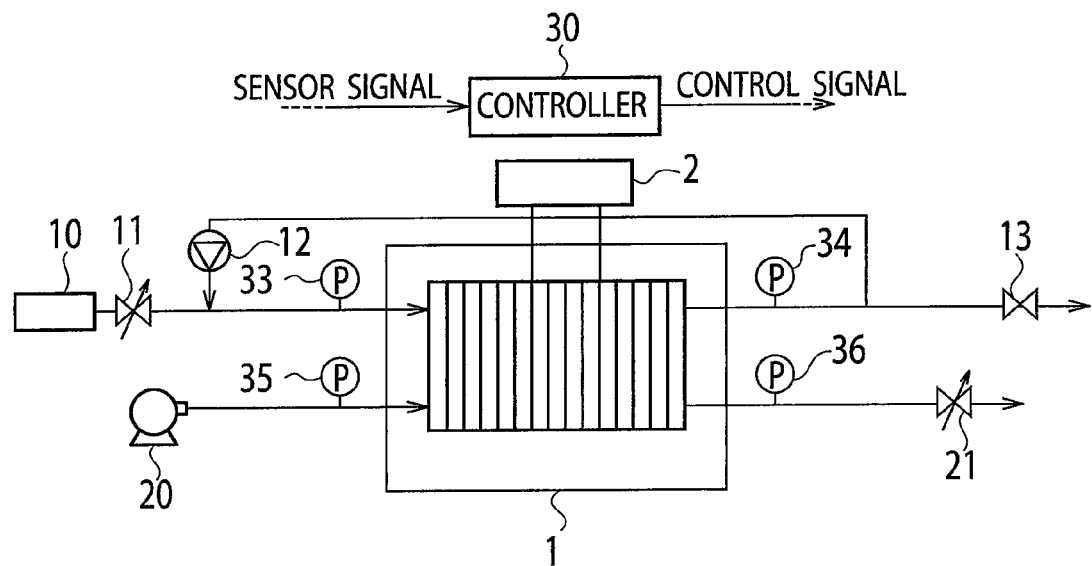
FIG. 7 is a structural view schematically showing the fuel cell system according to the third embodiment.

FIG. 7 is a structural view schematically showing the fuel cell system according to the third embodiment of the present invention. The fuel cell system according to the third embodiment is different from that according to the first embodiment, in that the generated water added quantity Wad is directly measured according to the third embodiment. Hereinafter, explanation of structures same as those according to the first embodiment is to be omitted and differences are to be mainly set forth.

Specifically, in the hydrogen system, pressure sensors 33, 34 for sensing the pressure are disposed on the respective upstream and downstream sides of the fuel cell stack 1. In addition, in the air system, pressure sensors 35, 36 for sensing the pressure are disposed on the respective upstream and downstream sides of the fuel cell stack 1. Signals from the pressure sensors 33 to 36 are inputted to the controller 30.

Based on the pressure sensors 33, 34 of the hydrogen system, the controller 30 can specify the pressure loss at the inlet and outlet of the fuel cell stack 1 on the fuel electrode side (hereinafter referred to as "stack pressure loss on fuel electrode side"). Moreover, based on the pressure sensors 35, 36 of the air system, the controller 30 can specify the pressure loss of the fuel cell stack 1 on the oxidant electrode side (hereinafter referred to as "stack pressure loss on oxidant electrode side"). In other words, the pressure sensors 33 to 36 function as sensors for sensing a differential pressure between the reactive gas pressure on the inlet side relative to the fuel cell stack 1 and the reactive gas pressure on the outlet side relative to the fuel cell stack 1.

Then, comparing the stack pressure loss with a determination value, the controller 30 determines whether or not the generated water retained by the reactive electrode (gas diffusion layer) has outflowed to the internal gas flow channel side among the unit cells more than or equal to the determination cell number (for example, all unit cells).

Figure 8:
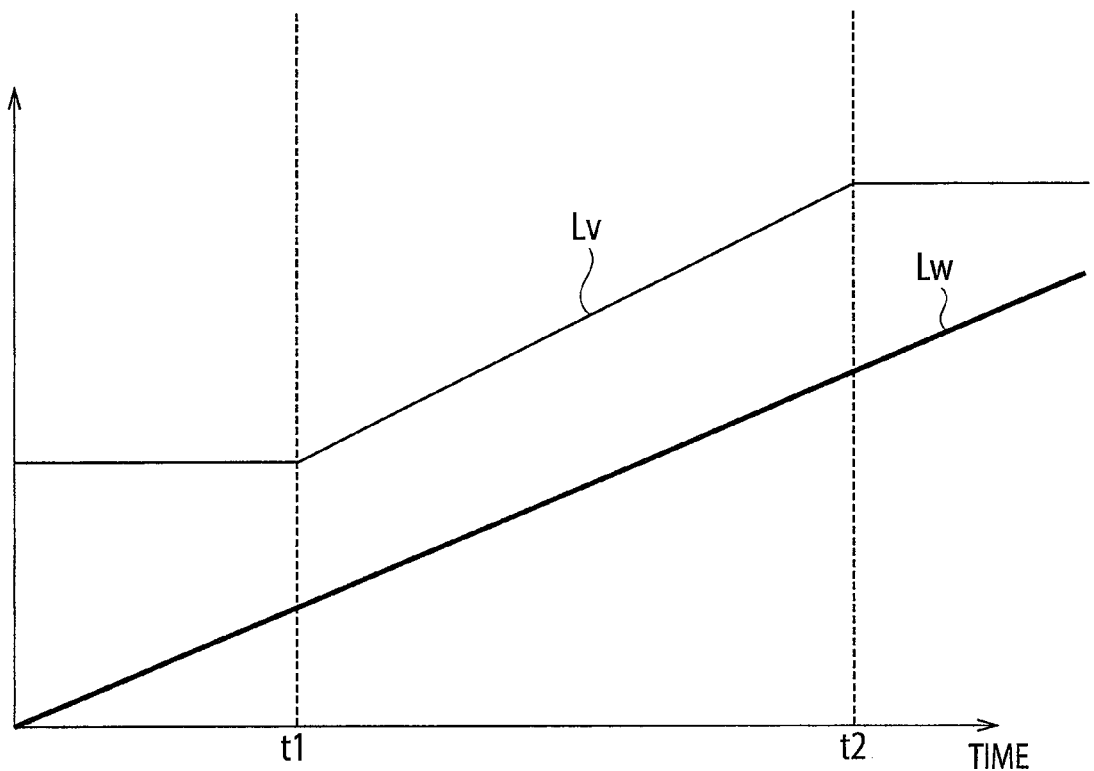
FIG. 8 is an explanatory view for explaining about a method of setting a determination value.

FIG. 8 is an explanatory view for explaining about a method of setting the determination value. Herein, how to set the determination value is to be explained. In FIG. 8, Lv denotes a transition of the stack pressure loss, and Lw denotes a transition of the generated water added quantity Wad. In the case that the generation of the fuel cell stack 1 is started, the generated water is not discharged to the internal gas flow channel side even when the generated water is caused, provided that the thus generated water is within the liquid retainable quantity of the gas diffusion layer of each unit cell. Therefore, the pressure loss of the internal gas flow channel of each unit cell is small and the stack pressure loss is also small.

Then, when the generated water starts outflowing to the internal gas flow channel, the stack pressure loss gradually gets larger (timing W. Then, when the generated water outflows from the gas diffusion layer among all of the unit cells, the stack pressure loss becomes the maximum (timing t2). In the case that the stack pressure loss reaches the maximum, the generated water outflows to the internal gas flow channel side among all of the unit cells. The variation of the pressure loss among the unit cells can be prevented, thus making it possible to use the maximum stack pressure loss as the determination value.

Specifically, at first, a constant generation state with the takeout current kept constant is set for the fuel cell stack 1. In this case, at the timing at which the generated water outflow to the internal gas flow channel starts varying among the unit cells, the unit cell having the worst reactive gas distribution property continues the generation at such a reactive gas flowrate as may cause the flooding. Then, the generated water outflows to the internal gas flow channel side, to thereby improve the distribution property of the reactive gas and resolve the flooding. A stack pressure loss which is calculated when the distribution property of the reactive gas is improved and the flooding is resolved is set as the determination value.

As set forth above, according to the third embodiment, the controller 30 implements the determination of the generated water outflow in the condition that the stack pressure loss reaches the differential pressure (between the outlet and inlet of the fuel cell stack 1) obtained when the generated water outflows to the internal gas flow channel side among the unit cells more than or equal to the determination cell number.

With the above structure, even under the same condition, the stack pressure loss varies between before and after the timing at which the generated water outflows to the internal gas flow channel. With this, the timing for ending the scene where the distribution flowrate varies can be accurately sensed.

INDUSTRIAL APPLICABILITY

Not only being used as an energy source installed on a vehicle, the fuel cell system and method of the present invention are applicable to various applications such as a stationary fuel cell system.

EXPLANATION OF NUMERALS 1 fuel cell stack
1a all unit cells
1a unit cell
1b gas diffusion layer
1c gas diffusion layer
1c internal gas flow channel
2 output takeout device
10 fuel tank
11 hydrogen pressure adjusting valve
12 hydrogen circulating valve
13 purge valve
14 air-liquid separator
20 compressor
21 air pressure adjusting valve
30 controller
31 current sensor
32 level sensor
33 pressure sensor
34 pressure sensor
35 pressure sensor
36 pressure sensor

The invention claimed is:

1. A fuel cell system comprising:
a fuel cell including a plurality of unit cells, each of the plurality of unit cells including a reactive electrode and an internal gas flow channel configured to supply a reactive gas to the reactive electrode,
wherein the reactive gas is supplied via the internal gas flow channel to thereby implement an electric generation, the electric generation by the fuel cell starting at a time that corresponds to a start point of a time-series transition of a current extracted from the fuel cell,
a current sensing section configured to sense the current extracted from the fuel cell;
a gas supplying section configured to supply the reactive gas to the fuel cell;
a differential pressure sensing section configured to sense a differential pressure between a pressure of the reactive gas on an inlet side of the fuel cell and a pressure of the reactive gas on an outlet side of the fuel cell;
a determining section programmed to
calculate, based on the time-series transition, a generated water added quantity that is a quantity of generated water that has outflowed to the internal gas flow channel,
determine whether a number of unit cells in which the generated water has outflowed to the internal gas flow channel is more than or equal to a determination cell number,
determine whether the generated water added quantity for the number of unit cells is a total quantity of generated water, the total quantity of generated water corresponding to generated water retainable by a number of unit cells equivalent to the determination cell number,
determine whether the differential pressure sensed by the differential pressure sensing section reaches a certain differential pressure between the outlet side and the inlet side of the fuel cell, the certain differential pressure being obtained when the number of unit cells in which the generated water has outflowed to the internal gas flow channel is more or equal to the determination cell number; and
a controlling section programmed to
start supplying the reactive gas from the gas supplying section at a first flowrate when the determining section does not determine that a variation of a reactive gas distribution quantity to individual unit cells is improved, and
after a determination that the generated water has outflowed to the internal gas flow channel among a number of unit cells that is more than or equal to the determination cell number so as to improve the variation of the reactive gas distribution quantity, change a flowrate of the reactive gas supplied from the gas supplying section from the first flowrate to a second flowrate that is smaller than the first flowrate.

2. The fuel cell system of claim 1, wherein each of the plurality of unit cells includes an oxidant electrode,
wherein, upon starting the fuel cell system, air is supplied to the oxidant electrode at a flowrate of air that is a start flowrate, and
wherein the controlling section is further programmed to change the flowrate of air from the start flowrate to an ordinary operation flowrate.

3. The fuel cell system of claim 2, wherein the controlling section is programmed to change the flowrate of air in parallel with changing the flowrate of fuel gas so as to decrease the flowrate of air and the flowrate of fuel gas in accordance with determination of generated water outflow by the determining section.

* * * * *